United States Patent [19]

Mescam et al.

[11] 4,249,239
[45] Feb. 3, 1981

[54] HIGH-SPEED COUPLER FOR TRANSMISSION LINES OR COMPUTER PERIPHERALS WHICH EMPLOYS A SPECIAL MICROINSTRUCTION STRUCTURE

[75] Inventors: Jean-Francois Mescam, Plaisir; Thomas Balla, Le Pecq, both of France

[73] Assignee: Compagnie Internationale Pour L'Informatique Cii-Honeywell Bull (Societe Anonyme), Paris, France

[21] Appl. No.: 961,203

[22] Filed: Nov. 16, 1978

[30] Foreign Application Priority Data

Nov. 21, 1977 [FR] France .................................. 77 34915

[51] Int. Cl.³ .............................................. G06F 3/00
[52] U.S. Cl. ................................................... 364/200
[58] Field of Search ......................... 364/200 MS File

[56] References Cited

U.S. PATENT DOCUMENTS 3,833,888  9/1974  Stafford et al. ....................... 364/200
3,969,724  7/1976  Anderson et al. .................... 364/200

Primary Examiner—Raulfe B. Zache
Attorney, Agent, or Firm—Kerkam, Stowell, Kondracki & Clarke

[57] ABSTRACT

An architecture for a special purpose microprocessor particularly adapted for coupling a computer to its associated peripheral devices or to transmission lines. To minimize restrictions on the speed of data exchange, the present microprocessor allows the following to take place simultaneously: (1) general coupling of the computer and associated transmission lines and, more particularly, execution of instructions for coupling, shifting, or indirect conditional branching; and (2) the performance of arithmetic and/or logic operations on data which is exchanged between the computer and the associated transmission or peripheral lines. The present microprocessor executes microinstructions which are stored in a control memory. The format of the microinstructions is such that information in various zones controls the functions to be simultaneously performed.

13 Claims, 15 Drawing Figures

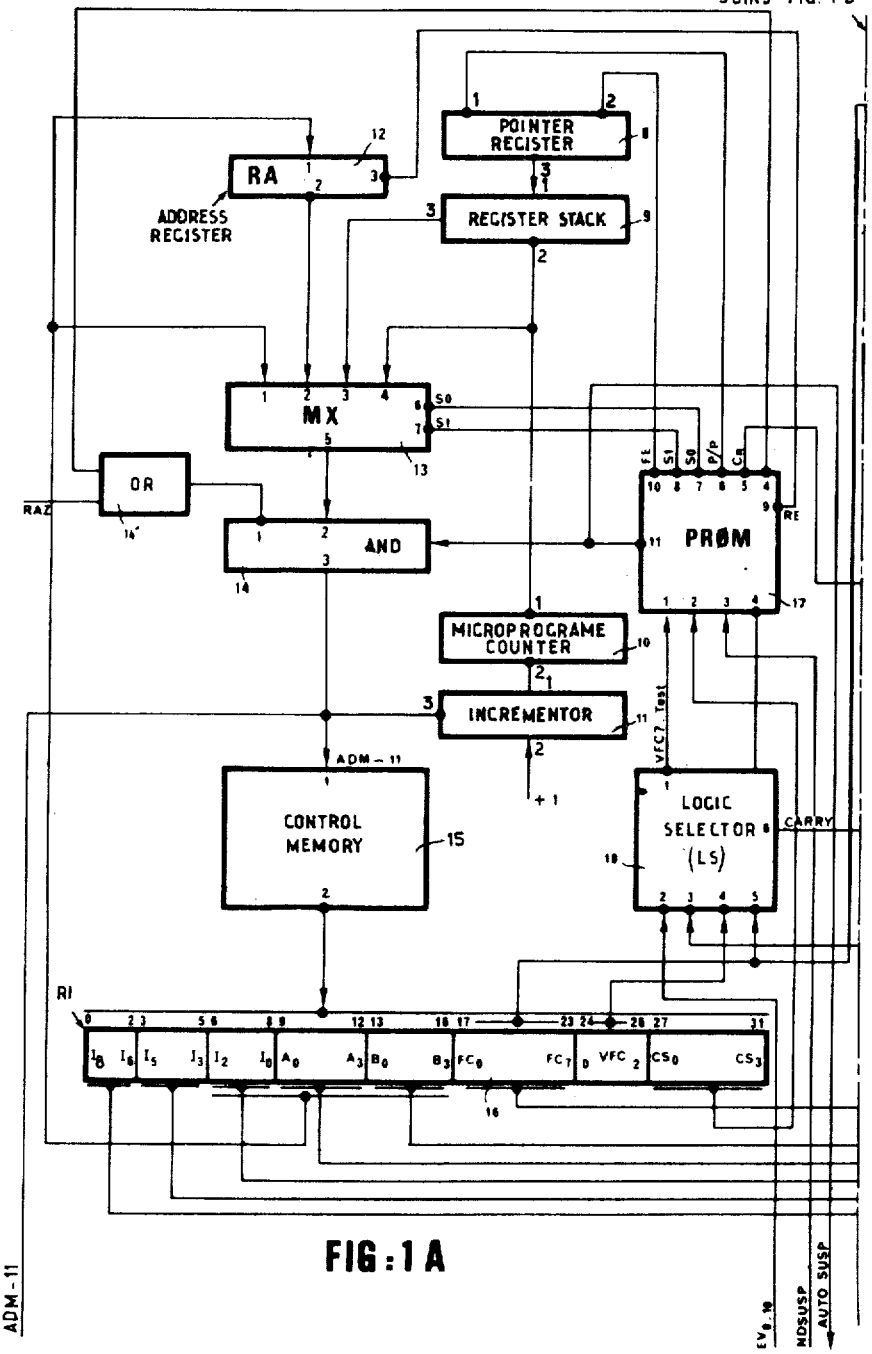
FIG:1A

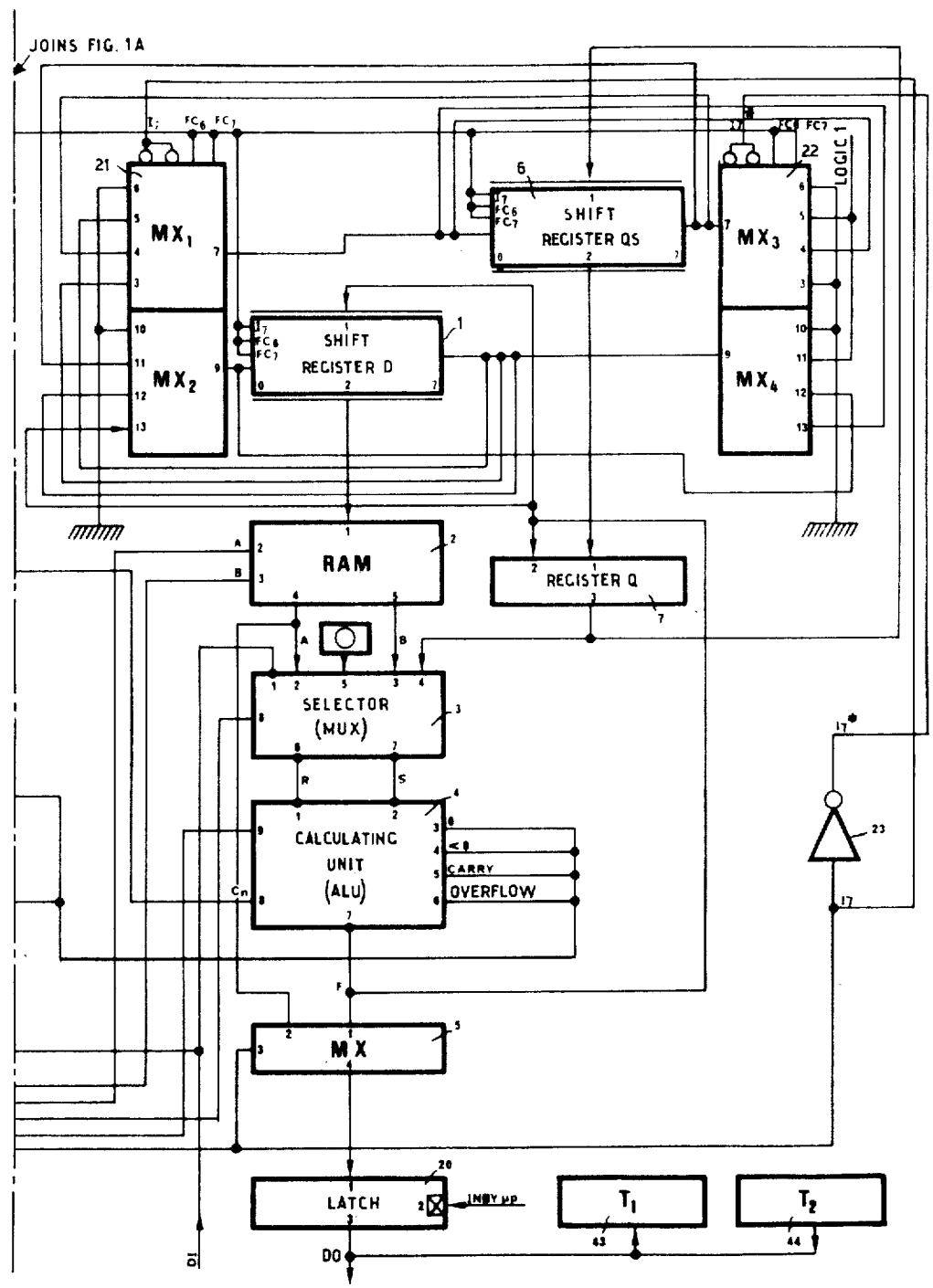
FIG:1B

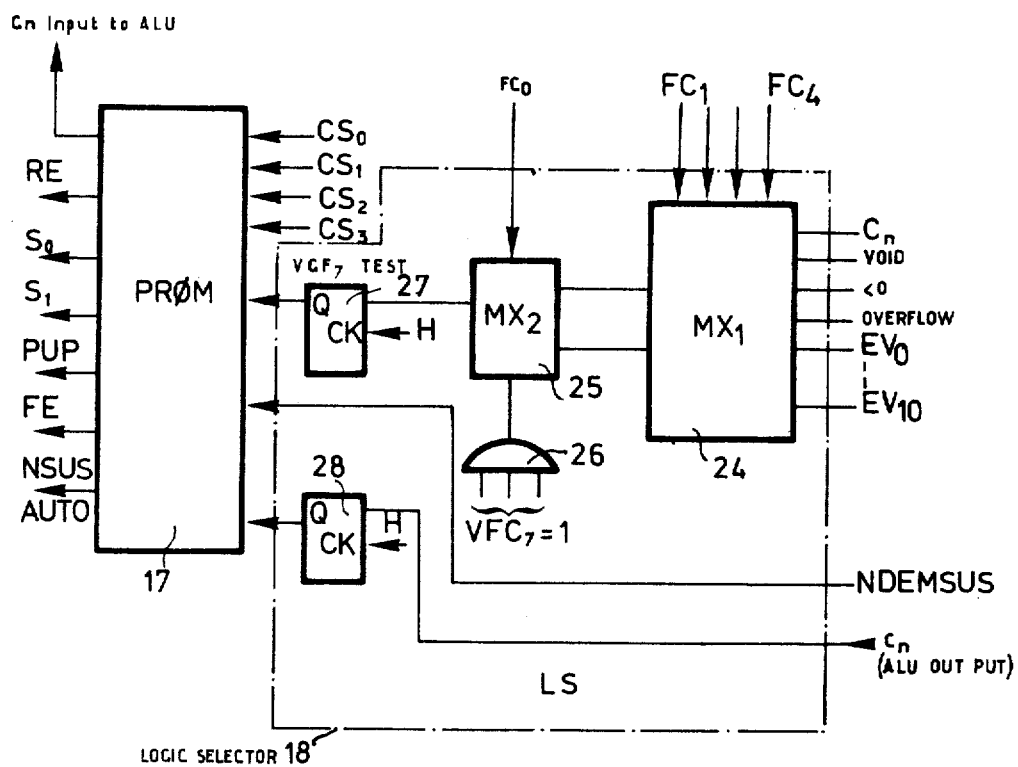
FIG: 2

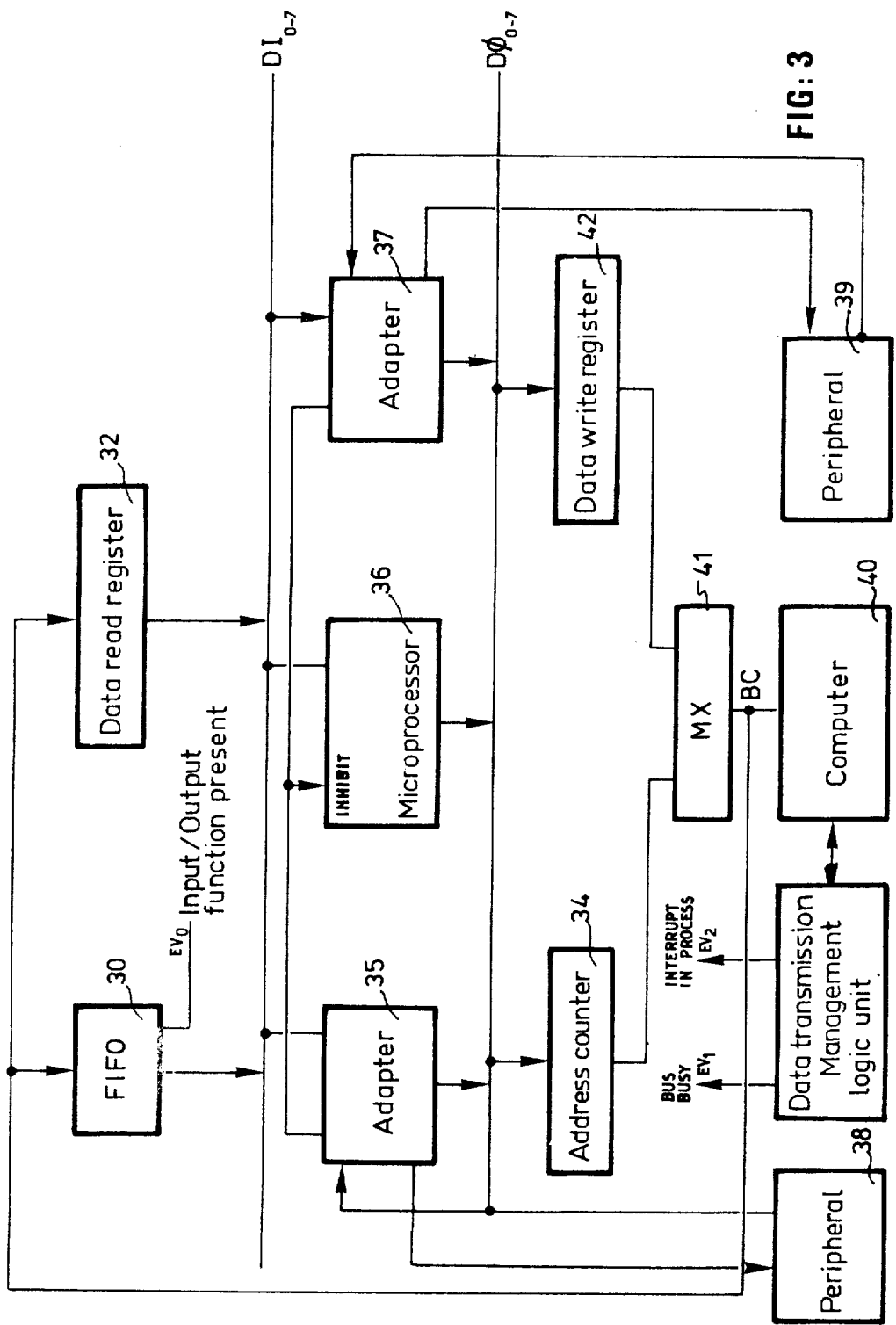

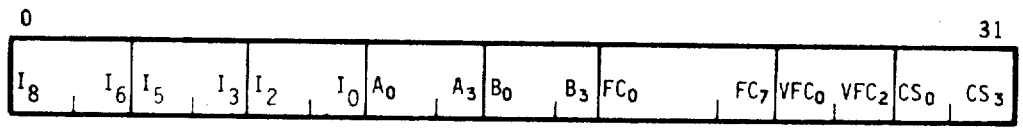
FIG: 4
FIG: 5A
| I2 | I1 | I0 | OPERAND SOURCES | |
|---|---|---|---|---|
| | | | R | S |
| 0 | 0 | 0 | RAM addressed by A | Q |
| 0 | 0 | 0 | RAM addressed by A | RAM addressed by B |
| 0 | 1 | 0 | Q | Q |
| 0 | 1 | 1 | Q | RAM addressed by B |
| 1 | 0 | 0 | Q | RAM addressed by A |
| 1 | 0 | 1 | DI | RAM addressed by A |
| 1 | 1 | 0 | DI | Q |
| 1 | 1 | 1 | DI | 0 |
FIG: 5B
| $I_5$ | $I_4$ | $I_3$ | ALU FUNCTION $C_n=0$ | ALU FUNCTION $C_n=1$ |
|---|---|---|---|---|
| 0 | 0 | 0 | R + S | R + S + 1 |
| 0 | 0 | 1 | S - R - 1 | S - R |
| 0 | 1 | 0 | R - S - 1 | R - S |
| 0 | 1 | 1 | RVS | RVS |
| 1 | 0 | 0 | RAS | RAS |
| 1 | 0 | 1 | $\overline{R}$AS | $\overline{R}$AS |
| 1 | 1 | 0 | R⊕S | R⊕S |
| 1 | 1 | 1 | $\overline{R⊕S}$ | $\overline{R⊕S}$ |

FIG. 6.

| $I_8$ | $I_7$ | $I_6$ | RAM ADDRESSED BY ZONE B | Q | DO OUTPUT |
|---|---|---|---|---|---|
| 0 | 0 | 0 | — | RESULT OF OPERATION | RESULT OF OPERATION |
| 0 | 0 | 1 | — | — | RESULT OF OPERATION |
| 0 | 1 | 0 | RESULT OF OPERATION | — | CONTENT OF RAM INDICATED BY ZONE A |
| 0 | 1 | 1 | RESULT OF OPERATION | — | RESULT OF OPERATION |
| 1 | 0 | 0 | RESULT OF OPERATION SHIFTED TO RIGHT | Q SHIFTED TO RIGHT | RESULT OF OPERATION |
| 1 | 0 | 1 | RESULT OF OPERATION SHIFTED TO RIGHT | — | RESULT OF OPERATION |
| 1 | 1 | 0 | RESULT OF OPERATION SHIFTED TO LEFT | Q SHIFTED TO LEFT | RESULT OF OPERATION |
| 1 | 1 | 1 | RESULT OF OPERATION SHIFTED TO LEFT | — | RESULT OF OPERATION |

FIG. 7.

| 0 | | | | | | | 31 |
|---|---|---|---|---|---|---|---|
| 0 0 1 0 0 | BRANCH ADDRESS | $FC_0$ | $FC_7$ | $VFC_0$ | $VFC_2$ | $CS_0$ | $CS_3$ |

FIG. 8.

| 0 | | | | | | | 31 |
|---|---|---|---|---|---|---|---|
| 0 0 1 0 0 | BRANCH ADDRESS | $SCT_0$ | $SCT_4$ | X X X | 1 1 1 | $CS_0$ | $CS_3$ |

FIG. 9A.

| SEQUENCER CONTROL INPUTS | | | | | SEQUENCER CONTROL OUTPUTS | | | | | |
|---|---|---|---|---|---|---|---|---|---|---|
| VFC$_7$-TEST | CS$_{0-3}$ | NDEMSUS | CARRY | C$_n$ | AUTO SUS | LOAD REG RA | NEXT ADDRESS INDICATED BY | POP STACK | PUSH µP COUNTER | MICROINSTRUCTION |
| CONDITION TO BE TESTED INVALIDATED OR NOT SATISFIED | 0 | NO | X | 0 | NO | NO | MICROPROGRAM COUNTER | NO | NO | STANDARD |
| | 0 | YES | X | 0 | YES | NO | '00X' | NO | YES | STANDARD SUSPENDED |
| | 1 | NO | X | 1 | NO | NO | MICROPROGRAM COUNTER | NO | NO | STANDARD |
| | 1 | YES | X | 1 | YES | NO | '00X' | NO | YES | STANDARD SUSPENDED |
| | 2 | X | X | 0 | NO | NO | MICROPROGRAM COUNTER | YES | NO | STANDARD |
| | 3 | X | X | 0 | NO | NO | MICROPROGRAM COUNTER | NO | YES | STANDARD SUSPENDED |
| | 4 | NO | X | 0 | NO | NO | MICROPROGRAM COUNTER | NO | NO | STANDARD |
| | 4 | YES | X | 0 | YES | NO | '00X' | NO | YES | STANDARD SUSPENDED |
| | 5 | NO | X | 1 | NO | NO | MICROPROGRAM COUNTER | YES | NO | STANDARD |
| | 5 | YES | X | 1 | YES | NO | MICROPROGRAM COUNTER | NO | YES | STANDARD SUSPENDED |
| | 6 | X | X | 0 | NO | NO | MICROPROGRAM COUNTER | NO | NO | STANDARD |
| | 7 | X | X | 0 | NO | NO | MICROPROGRAM COUNTER | NO | YES | STANDARD |
| | 8 | X | X | 0 | NO | NO | ADDRESS REGISTER | NO | NO | STANDARD UNCONDITIONAL JUMP |
| | 9 | X | X | 0 | NO | NO | REGISTER STACK | NO | NO | STANDARD UNCONDITIONAL RETURN |

FIG. 9B.

| SEQUENCER CONTROL INPUTS | | | | | SEQUENCER CONTROL OUTPUTS | | | | | | |
|---|---|---|---|---|---|---|---|---|---|---|---|
| VFC$_7$-TEST | CS$_{0-3}$ | NDEMSUS | CARRY | C$_n$ | AUTO SUS | LOAD REG. RA | NEXT ADDRESS INDICATED BY | POP STACK | PUSH µP COUNTER | MICRO-INSTRUCTION | |
| CONDITION TO BE TESTED IN-VALIDATED OR NOT SATISFIED | A | X | X | C$_n$=CARRY | NO | NO | MICROPROGRAM COUNTER | NO | NO | STANDARD | |
| | B | X | X | 1 | NO | NO | Register STACK | NO | NO | STANDARD UNCONDITIONAL RETURN | |
| | C | X | X | 0 | NO | NO | INPUT 1 OF MX 13 | NO | YES | UNCONDITIONAL BRANCHING | |
| | D | X | X | 0 | NO | NO | INPUT 1 OF MX 13 | NO | NO | " | |
| | E | X | X | 0 | NO | YES | MICROPROGRAM COUNTER | NO | YES | SUSPENDED UNCONDITIONAL BRANCH | |
| CONDITION TO BE TESTED VALIDATED AND SATISFIED | F | NO | X | 0 | NO | YES | 'OOX' | NO | NO | CONDITIONAL BRANCH | |
| | F | YES | X | 0 | YES | | | | | | |
| | 0 | NO | X | 0 | NO | NO | INPUT 1 OF MX 13 | NO | NO | " | |
| | 0 | YES | X | 0 | NO | NO | INPUT 1 OF MX 13 | NO | NO | " | |
| | 1 | NO | X | 1 | NO | NO | INPUT 1 OF MX 13 | NO | NO | " | |
| | 1 | YES | X | 1 | NO | NO | INPUT 1 OF MX 13 | NO | NO | " | |
| | 2 | X | X | 0 | NO | NO | INPUT 1 OF MX 13 | NO | NO | " | |
| | 3 | X | X | 0 | NO | NO | INPUT 1 OF MX 13 | YES | NO | " | |
| | 4 | NO | X | 0 | NO | NO | ADDRESS REGISTER | NO | NO | STANDARD CONDITIONAL JUMP | |
| | 4 | YES | X | 0 | NO | NO | ADDRESS REGISTER | NO | NO | " | |

FIG. 9C.

| SEQUENCER CONTROL INPUTS | | | | | SEQUENCER CONTROL OUTPUTS | | | | | |
|---|---|---|---|---|---|---|---|---|---|---|
| VFC$_7$ - TEST | CS$_{0-3}$ | NDEMSUS | CARRY | C$_n$ | AUTO SUS | LOAD REG. | NEXT ADDRESS INDICATED BY | POP STACK | PUSH µP COUNTER | MICRO-INSTRUCTION |
| | 5 | NO | X | 1 | NO | NO | ADDRESS REGISTER | NO | NO | STANDARD CONDITIONAL JUMP |
| | 5 | YES | X | 1 | NO | NO | ADDRESS REGISTER | NO | NO | " |
| | 6 | X | X | 0 | NO | NO | ADDRESS REGISTER | YES | NO | " |
| | 7 | X | X | 0 | NO | NO | ADDRESS REGISTER | NO | YES | " |
| | 8 | | | | | | | | | |
| | 9 | | | | | | | | | |
| | A | | | | | | | | | |
| | B | | | | | | | | | |
| | C | | | | | | | | | |
| | D | | | | | | | | | |
| | E | | | | | | | | | |
| | F | | | | | | | | | |

CONDITION TO BE TESTED VALIDATED AND SATISFIED

FIG. 10.

| CODE | | | SOURCE OF FRESH DATA | | | | SHIFT | TYPE |
|---|---|---|---|---|---|---|---|---|
| $I_7$ | $FC_6$ | $FC_7$ | $QS_7$ | $QS_0$ | $D_7$ | $D_0$ | | |
| 1 | 0 | 0 | 0 | $QS_1$ | 0 | $D_1$ | LEFT | ZERO |
| 1 | 0 | 1 | 1 | $QS_1$ | 1 | $D_1$ | LEFT | ONE |
| 1 | 1 | 0 | $QS_0$ | $QS_1$ | $D_0$ | $D_1$ | LEFT | CIRCULAR |
| 1 | 1 | 1 | 0 | $QS_1$ | $Q_0$ | $D_1$ | LEFT | DOUBLE LOGIC |
| 0 | 0 | 0 | $QS_6$ | 0 | $D_6$ | 0 | RIGHT | ZERO |
| 0 | 0 | 1 | $QS_6$ | $D_7$ | $D_6$ | $QS_7$ | RIGHT | DOUBLE CIRCULAR |
| 0 | 1 | 0 | $QS_6$ | $QS_7$ | $D_6$ | $D_7$ | RIGHT | CIRCULAR |
| 0 | 1 | 1 | $QS_6$ | $D_7$ | $D_6$ | $F_0$ FROM ALU | RIGHT | DOUBLE ARITHMETIC |

FIG. 11.

| $FC_0$ | $FC_1$ | $FC_2$ | $FC_3$ | $FC_4$ | | |
|---|---|---|---|---|---|---|
| 0 | 0 | 0 | 0 | 0 | NØP RUNNING OF STANDARD MICROINSTRUCTIONS | |
| 0 | 0 | 0 | 0 | 1 | ALU $C_n$ OUTPUT | (= 1) |
| 1 | 0 | 0 | 0 | 1 | " " " | (= 0) |
| 0 | 0 | 0 | 1 | 0 | VOID | (= 1) |
| 1 | 0 | 0 | 1 | 0 | " | (= 0) |
| 0 | 0 | 0 | 1 | 1 | NEGATIVE | (= 1) |
| 1 | 0 | 0 | 1 | 1 | " | (= 0) |
| 0 | 0 | 1 | 0 | 0 | OVERFLOW | (= 1) |
| 1 | 0 | 1 | 0 | 0 | " | (= 0) |
| 0 | 0 | 1 | 0 | 1 | INPUT/OUTPUT FUNCTION PRESENT | (= 0) $EV_0$ (= 1) |
| 1 | 0 | 1 | 0 | 1 | | |
| 0 | 0 | 1 | 1 | 0 | BUSY BUSY | (= 1) $EV_1$ |
| 1 | 0 | 1 | 1 | 0 | " " | (= 0) |
| 0 | 0 | 1 | 1 | 1 | INTERRUPT IN PROCESS | (= 1) $EV_2$ |
| 1 | 0 | 1 | 1 | 1 | | (= 0) |
| 0 | 1 | 0 | 0 | 0 | DATA READ PARITY ERROR | (= 1) $EV_3$ |
| 1 | 1 | 0 | 0 | 0 | " " " " | (= 0) |
| 0 | 1 | 0 | 0 | 1 | | (= 1) $EV_4$ |
| 1 | 1 | 0 | 0 | 1 | | (= 0) |
| 0 | 1 | 0 | 1 | 0 | | (= 1) $EV_5$ |
| 1 | 1 | 0 | 1 | 0 | | (= 0) |
| 0 | 1 | 0 | 1 | 1 | | (= 1) $EV_6$ |
| 1 | 1 | 0 | 1 | 1 | | (= 0) |
| 0 | 1 | 1 | 0 | 0 | | (= 1) $EV_7$ |
| 1 | 1 | 1 | 0 | 0 | | (= 0) |
| 0 | 1 | 1 | 0 | 1 | | (= 1) $EV_8$ |
| 1 | 1 | 1 | 0 | 1 | | (= 0) |
| 0 | 1 | 1 | 1 | 0 | | (= 1) $EV_9$ |
| 1 | 1 | 1 | 1 | 0 | | (= 0) |
| 0 | 1 | 1 | 1 | 1 | | (= 1) $EV_{10}$ |
| 1 | 1 | 1 | 1 | 1 | | (= 0) |

HIGH-SPEED COUPLER FOR TRANSMISSION LINES OR COMPUTER PERIPHERALS WHICH EMPLOYS A SPECIAL MICROINSTRUCTION STRUCTURE

BACKGROUND OF THE INVENTION

The present invention relates to couplers between transmitters and receivers and in particular to couplers for transmission lines or for coupling peripherals to computers.

In the computer art, it is known to relieve the processing unit, usually termed the CPU, of the task of managing the input/output lines or the peripherals by means of microprocessors which are connected between the processing unit and the various peripheral devices.

The use of microprocessors calls for the employment of a program which is written employing instructions of a kind defined by the operating manual for the microprocessor. Each instruction naturally has corresponding to it a series of microinstructions and the execution of an instruction requires a more or less great number of microprocessor cycles. The execution of one microinstruction generally requires only a single cycle. Consequently, programming a microprocessor to allow it to be used in a coupler restricts the speed of data exchanges along transmission or peripheral lines, particularly if the transmission lines and the operations to be performed on the data are large in number.

SUMMARY OF THE INVENTION

The present invention thus has as an object to provide a new microprocessor which enables transmission or peripheral lines to be coupled at high speed, without the need for special types of instruction to be defined to allow the microprocessor to be used.

The present invention also has as an object to provide a microprocessor architecture in which the functions of coupling transmission or peripheral lines and the functions of processing the data exchanged along the transmission or peripheral lines take place simultaneously.

BRIEF DESCRIPTION OF THE DRAWINGS

The invention will be better understood with the aid of the following description, given with reference to the accompanying drawings, in which:

FIGS. 1A and 1B when joined show the architecture of the microprocessor which is the subject of the invention;

FIG. 2 shows details of the make-up of the logic selector unit;

FIG. 3 shows the microprocessor of the invention used for coupling a computer to its peripheral units;

FIG. 4 shows the format of the standard microinstruction;

FIG. 5A summarizes the various actions that can be performed by the calculating unit;

FIG. 5B shows the source of the operands;

FIG. 6 is a table showing the operations controlled by bits $I_8$ to $I_6$ of the microinstruction;

FIG. 7 shows the format of the microinstruction for unconditional branching;

FIG. 8 shows the format of a microinstruction for conditional branching;

FIGS. 9A, 9B and 9C together show the coding for the programmable memory which is involved in the construction of the sequencing circuit;

FIG. 10 is a table showing the types of shift performed in registers D and QS of FIG. 1B; and FIG. 11 is a table showing the conditions to be tested.

DESCRIPTION OF THE PREFERRED EMBODIMENT

The microprocessor shown in FIGS. 1A and 1B is made up of processing means, organized around a calculating unit or arithmetic logic unit (ALU) 4, and means for addressing a control memory 15 in which microinstructions are stored. In a preferred embodiment of the invention the control memory 15 has a capacity of 2K words of 32 bits. This capacity may be enlarged by adding memory units of 2K word capacity.

The calculating unit 4 performs operations on five inputs which are multiplexed (MUX) via a selector 3. The selector 3 has:

An input 1 which receives data DI coming from outside the processor and bits coming from zones 17 to 23 of a microinstruction register RI 16;

Inputs 2 and 3 which are connected to outputs 4 and 5 of RAM working registers in a circuit 2, there being sixteen RAM working registers. (Each input 2 or 3 of the selector 3 can be connected to one of the sixteen registers in RAM circuit 2, which registers are addressed at inputs 2 and 3);

An input 4 which is connected to output 3 of a register Q 7; and

An input 5 at which the selector 3 receives the number binary 0.

In a preferred embodiment of the invention the calculating unit 4 operates on words eight bits long. However, it is clear that it would be possible to design other calculating units operating on words of different lengths.

Outputs 6 and 7 of the selector 3 are connected to inputs 1 and 2 respectively of the calculating unit 4, which inputs receive the operands R and S on which arithmetic or logic operations are performed.

The calculating unit 4 also receives, at its input 8, a carry indicator $C_n$. The result of the operation performed between inputs R and S and the carry $C_n$ appears at output 7 of the calculating unit 4 and is dispatched to a number of destinations.

The result of the operation is transmitted along a data line DO via a multiplexer 5 and a latch 20, and it is also transmitted to input 2 of register Q 7 and to one of the RAM working registers 2 via a shift register D 1. The content of register Q 7 may be transferred to a shift register QS 6 via a connection between the output 3 of register Q 7 and the input 1 of register QS 6. The content of register QS 6 may then in turn be transferred back, with or without shift, to the same register Q 7 by a connection with links the output 2 of register QS 6 to the input 1 of register Q 7.

The shift operation in shift registers QS 6 and D 1 may take various forms depending upon the state of multiplexers 21 and 22, which are respectively controlled by signals $FC_6$, $FC_7$, $I_7$ and $FC_6$, $FC_7$ and $I_7^*$. A summary of these operations is given in the table of FIG. 10. Thus, a shift to the left in registers D and QS can only take place if a signal $I_7$ is at the logic high level ($I_7=1$), while a shift to the right in the same registers takes place if a signal $I_7$ is at the logic low level ($I_7=0$). In this latter case signal $I_7^*$ is emitted by an inverter 23.

Once the shift operations have taken place, a transfer takes place from shift register D 1 to one of the registers of RAM circuit 2 and from shift register QS 6 to register Q 7. Thus, referring to FIGS. 1B and 10, on the command $(I_7, FC_6, FC_7)=(1, 0, 0)$, input 6 of multiplexer $MX_3$ transmits a logic 0 bit to location $QS_7$ of register QS 7, and all the bits in locations $QS_6$ to $QS_0$ are shifted one place to the left. Similarly, input 10 of multiplexer $MX_4$ transmits a logic 0 bit to location $D_7$ of register D 1 to all the bits in locations $D_6$ and $D_0$ are shifted to the left, each by one location.

On the command $(I_7, FC_6, FC_7)=(1, 0, 1)$, input 5 of multiplexer $MX_3$ transmits a logic 1 bit to location $Q_7$ of shift register QS 6 and all the bits in locations $QS_6$ to $QS_0$ are shifted one place to the left. Similarly, input 11 of multiplexer $MX_4$ transmits a logic 1 bit to location $D_7$ of shift register D 1 and all the bits in locations $D_6$ to $D_0$ are shifted one place to the left.

At the command $(I_7, FC_6, FC_7)=(1, 1, 0)$, a circular shift takes place in the shift registers D 1 and QS 6, location $QS_7$ then being occupied by the bit which was occupying location $QS_0$ and location $D_7$ being occupied by the bit which was occupying location $D_0$, the "7" locations being looped back to the "0" locations by means of inputs 4 and 12 of multiplexers $MX_3$ and $MX_4$.

At the command $(I_7, FC_6, FC_7)=(1, 1, 1)$, a double logic shift is performed by placing shift registers D 1 and QS 6 in series, multiplexers $MX_3$ and $MX_4$ being at input positions 3 and 13. In this double logic shift mode, location $QS_7$ of register QS 6 stores a logic 0 bit, all the other bits being shifted one place to the left. Thus, the bit formerly at location $QS_1$ is found at location $QS_0$, and the bit formerly at location $Q_0$ is found at location $D_7$.

At the command $(I_7, FC_6, FC_7)=(0, 0, 0)$, a shift to the right by one bit location takes place in shift registers QS 6 and D 1 by switching multiplexers $MX_1$ and $MX_2$ to input positions 6 and 10, the consequence of which is that a logic 0 bit is fed to each of locations $QS_0$ and $D_0$ from registers D 1 and QS 6.

In the event of the combination $(I_6, FC_6, FC_7)=(0, 0, 1)$, multiplexers $MX_1$ and $MX_2$ are switched to input positions 5 and 11 and the two registers are connected in series to perform a double circular shift to the right. With this configuration, the bit at location $QS_6$ arrives at location $QS_7$, and the bit at location $QS_7$ arrives at location $D_0$.

In the case of the combination $(I_7, FC_6, FC_7)=(0, 1, 0)$, a circular shift to the right takes place in each of the shift registers D 1 and QS 6 by switching multiplexers $MX_1$ and $MX_2$ to input positions 4 and 12.

Finally, in the case of the combination $(I_7, FC_6, FC_7)=(0, 1, 1)$, a double arithmetic shift to the right takes place by switching multiplexers $MX_1$ and $MX_2$ to their input positions 3 and 13. In this mode, bit $F_0$ of the result of the operation (from the ALU 4) if fed back to location $D_0$, when $D_0$ is shifted to $D_1$ and bit $D_7$ is shifted to $QS_0$.

When a word contained in one of the registers of RAM circuit 2 requires no processing after being read, it is transmitted directly from output 4 of RAM circuit 2 to input 2 of multiplexer 5 without passing through the calculating unit 4.

The calculating unit 4 also has outputs which indicate the results of operations on the two operands R and S. Output 3 indicates a result of zero, output 4 indicates a result <0, output 5 indicates a carry, and output 6 indicates an overflow. These various output signals are transmitted to input 3 of a logic selector unit 18. These outputs may also be termed "flags".

Output 2 of the control memory 15 is connected to the parallel inputs of the microinstruction register RI 16 which stores the microinstruction currently being executed when the microprograms recorded in the control memory 15 are being run. In the microinstruction register 16, three groups of flip-flops control:

(a) the sources of the operands;

(b) the operation which is to be performed in the calculating unit 4; and (c) the destinations.

In FIG. 1A, flip-flops $I_2$ to $I_0$ control the source of the operands, the outputs of these flip-flops being connected to input 8 of the selector 3. Flip-flops $I_5$ to $I_3$ control the calculating operation and are connected via their outputs to input 9 of the calculating unit 4. Flip-flops $I_8$ to $I_6$ control the destination and have their outputs connected to input 3 of multiplexer 5 and to the control inputs of shift registers D 1 and QS 6.

The selection of the address of a mircoinstruction contained in the control memory 15 is accomplished by a sequencing circuit or sequencer which is able to select the address of the microinstruction from five sources as follows: (1) At initializing (RAZ), address 0 is selected and is applied to input 1 of an AND gate 14. After initializing, the address of the microinstruction may be selected either (2) from a microprogram counter 10, whose output 1 is connected to input 4 of a multiplexer 13; or (3) from a stack 9 of four registers whose output 3 is connected to input 3 of multiplexer 13; or (4) from an address register RA 12 which may be pre-loaded with the microprogram, the output 2 of the address register 12 being connected to input 2 of multiplexer 13; or (5) from the microinstruction register RI 16, from which the outputs of flip-flops 6 to 16 are connected directly to input 1 of multiplexer 13.

Coming from a source selected by multiplexer 13, the address of the microinstruction is transmitted from output 5 of the multiplexer 13 to input 2 of AND gate 14. The output 3 of AND gate 14, being connected to input 1 of the conrol memory 15, transmits the address of the microinstruction being sought to the control memory 15. The output 3 of AND gate 14 is also connected to the input 3 of an incrementor 11. The address contained in the incrementor 11 can be increased by one unit at each clock cycle by the action of the clock signal on its input 2. Output 1 of the incrementor 11 is connected to input 2 of the microprogram counter 10, whose output 1 is connected to input 2 of the stack 9. In the illustrated embodiment of the invention, the stack 9 contains four registers.

The stack 9 acts as a safeguarding register for the purpose of executing the sub-programs and for suspensions, suspension requests arriving along a connection NDSUSP. When a suspension is received, output 4 of a programmable read-only memory PROM 17 applies a logic zero to input 1 of the three-state AND gate 14, via an OR gate 14', and orders the address of the suspended microprogram to be safeguarded, authorizing the content of the microprogram counter 10 to be transferred to the stack 9.

When the "suspension authorized" signal appears, it is open to the user to apply the least significant digits of an address between 1 and 15 via leads $ADM_{8-11}$ and thus to gain access to fifteen different programs. Thus, by virtue of this arrangement, a suspension request corresponds to sixteen different programs.

A pointer register 8 enables any register to be selected in the stack 9 and it is connected by its output 3 to input 1 of the stack 9.

The programmable memory PROM 17 is used to control the sequencer and to determine the input carry for the calculating unit 4. It can be addressed by (1) the outputs of flip-flops 27 to 31 of microinstruction register 16, which emit signals $CS_0$ to $CS_3$; (2) by the output 1 of the logic selector unit 18; (3) by a suspension order NDSUSP coming from outside the microprocessor; and (4) by the carry resulting from an operation, which is emitted by output 5 of the calculating unit 4 and transmitted to input 4 of the memory 17. The logic selector unit 18 makes it possible to select one of fifteen conditions to be tested, as a function of the coupling functions presented to the inputs of flip-flops $FC_0$ to $FC_7$, if the combination ($VFC_0$, $VFC_1$, $VFC_2$)=(1, 1, 1). The logic selector 18 is described in greater detail below with particular reference to FIG. 2.

The conditions to be tested comprise eleven external events $EV_{0-10}$ and the flags from the calculating unit 4.

The PROM memory 17 emits from its output 4 to 11 the signals required to control the components of the sequencer and the calculating unit 4. Output 5 of the PROM circuit 17 is connected to input 8 of the calculating unit 4 for the possible transmission of a carry bit $C_n$.

PROM 17 output 6 transmits a push/pop (P/P) signal to allow the register stack 9 to be run through in the ascending or descending direction and is connected to input 1 of the stack pointer register 8. PROM outputs 7 and 8 are connected to inputs 6 and 7 respectively of multiplexer 13 and emit signals $S_0$ and $S_1$ for selecting inputs 1 to 4 of the multiplexer 13. Output 10 is connected to input 2 of pointer register 8 and provides the signal FE for enabling the input of the stack registers 9. Finally, output 11 of the PROM memory 17 emits the suspension authorizing signal when a suspension has been requested by a member external to the microprocessor.

The three-state latch 20 passes on the results of operations to a data line DO which may be connected at the input and output ends to working registers. When the latch 20 is inhibited by a signal "INBY-$\mu$p", the microprogram is still executed but the results are not transmitted to the data line DO and by using the coupling functions it is possible for the operator to make use of the working registers $T_1$ and $T_2$, (43 and 44), connected to line DO. This latter facility is used when there is no processing to be performed on the data to be loaded into register $T_1$ 43.

FIG. 2 shows details of the logic selector unit LS 18 of FIG. 1A and the way in which it is coupled to the programmable memory PROM 17. The logic selector 18 includes a first multiplexer $MX_1$ 24 which receives, at first inputs, the following signals coming from the calculating or arithmetic logic unit (ALU) 4: a carry $C_n$, a void operation, a negative result ($<0$), or an overflow; and which receives, at second inputs, the event signals $EV_0$ to $EV_{10}$ emitted by the members external to the microprocessor. These signals are selected as a function of the combination of microinstruction bits in microinstruction register 16 and are applied to the address inputs of the multiplexer 24. The multiplexer 24 has two outputs which enable the signal for testing to be selected. A first output emits the selected signal in its direct state and a second output emits the selected signal in the inverted state. These two outputs are connected to respective ones of two inputs of a second multiplexer $MX_2$ 25, which inputs are selected in the multiplexer 25 by the coupling function $FC_0$ transmitted from the output of flip-flop 17 in the microinstruction register 16. Neither of the two inputs of the multiplexer 25 can be selected unless the combination ($VFC_0$, $VFC_1$, $VFC_2$) of the validating bits for the coupling functions is (1, 1, 1), which is indicated in FIG. 2 by the notation $VFC_7=1$ at the input of AND gate 26.

The signal selected by means of the multiplexer 25 is then stored in a D flip-flop 27 to form an address bit for the PROM memory 17. A D flip-flop 28 stores the carry signal $C_n$ which appears at the output of the arithmetic logic unit 4 and forms an address bit CNS ALUM for the PROM memory 17. The other address bits for the PROM memory 17 are provided by the signals $CS_0$ to $CS_3$ and the signal NDEMSUS. The PROM memory 17 emits from its output side the bits RE, $S_0$, $S_1$, PUP, FE for controlling the sequencer and the "$C_n$ input to ALU" and NSUS AUTO bits of which the meanings are explained above. As will have been realized, the multiplexer $MX_2$ 25 is controlled by logic AND gate 26, which receives the three bits present at the inputs of flip-flops VFC in the microinstruction register 16.

FIGS. 9A through 9C show, in the form of a table, the states of the output bits from the PROM memory 17, which are termed the "sequencer control outputs", as a function of address bits termed "sequencer conrol inputs". The table in FIG. 9A and the upper half of the table in FIG. 9B represent the content of the PROM memory 17 either when the combination ($VFC_0$, $VFC_1$, $VFC_2$) is different from (1, 1, 0), the condition to be n tested then being invalidated, or when the combination ($VFC_0$, $VFC_1$, $VFC_2$) is (1, 1, 1), the condition to be tested then being unsatisfied. In these two cases, the next microinstruction may be a normal microinstruction or an unconditional branch microinstruction. Thus, in FIG. 9A, when the following combination is present at the "sequencer control" inputs:

(1) Bits $CS_{0-3}$ of microinstruction RI 16 all zero; and
(2) No suspension order (bit NDEMSUS $=0$); then the sequencer control outputs emit:

(1) A carry bit $C_n=0$ to the calculating unit (ALU) 4;
(2) A suspension authorizing signal of logic zero to forbid any suspension;
(3) An RE signal of logic zero to prevent register RA 12 from being loaded;
(4) Signals $S_0$ and $S_1$ to switch the multiplexer MX 13 to its position 4 so that the next address can be taken from the microprogram counter 10;
(5) A "Pop/Stack" or P/P signal of logic zero to prevent the register stack 9 from being run through; and
(6) A "push-up counter" signal of logic zero to prevent the content of the microprogram counter from being fed to the stack.

On the next line on the table in FIG. 9A the result of the combination of sequencer control inputs $CS_{0-3}=0$, NDEMSUS $=1$ (suspension request present at the input of the microprocessor) on the sequencer control outputs is:

(1) The emission of the suspension authorizing signal, which inhibits AND gate 14;
(2) The control memory 15 being addressed by the bits $ADM_{8-11}$ supplied by the members external to the microprocessor; and
(3) A signal P/P=1 (see PUSH MICROPROGRAM COUNTER column) and the signal FE=0 (see POP STACK column) being emitted, the consequence of which is that one of sixteen microprogram levels is addressed and that the content of the microprogram counter 10 is fed to stack register 9. The microinstruction is then said to be standard suspended.

For the $CS_{0-3}$ combinations from 1 to 7, FIG. 9A shows that the next microinstruction is always standard and that if a suspension request occurs, sixteen microprogram levels may be addressed.

For the combination $CS_{0-3} = 8$, the next address is situated in address register RA 12, bits $S_0$ and $S_1$ switching multiplexer 13 to its input 2; this combination authorizes an unconditional jump.

For the combination $CS_{0-3} = 9$, the next address is found in the stack register 9 (multiplexer 13 at input position 3), thus allowing an unconditional return.

The lower half of the table in FIG. 9B and the table in FIG. 9C represent the content of the PROM memory 17 when the combination ($VFC_0$, $VFC_1$, $VFC_2$) is (1, 1, 1) and when the condition tested is satisified.

In this case the next microinstruction must be the result of a conditional branch to the address indicated either by the direct input 1 of multiplexer 5 or by the address register RA 12. The conditions to be tested are situated either in the microprocessor at the output of the calculating unit 4 or else outside the microprocessor as reported by the external events.

Thus, in FIG. 9B the combination $CS_{0-3} = 0$, coupled with no suspension address being present, sets the multiplexer MX 13 to its input 1, and the next address is then obtained directly from microinstruction register RI 16. A conditional branch then takes place to the address indicated by microinstruction register RI 16. The branch address is also taken from register RI 16 in the case of the next combinations 1 to 3 of bits $CS_{0-3}$. For combinations 4 to 7 of bits $CS_{0-3}$ (FIGS. 9B and 9C), multiplexer MX 13 is set to its input position 2 and the next address is then indicated by address register RA 12. This latter position enables conditional jumps to be obtained.

The conditions to be tested are selected by the coupling function bits $FC_0$ to $FC_4$ as shown by the table in FIG. 11.

FIG. 3 shows the microprocessor which is the subject of the invention applied specifically to the problem of coupling transmission lines or computer peripherals.

The data lines or buses DI and DO connect the microprocessor 36 to adapter units 35 and 37 and enable input/output connections to be established between a computer 40 and peripheral members 38 and 39. The connection between the computer 40 and data line DO is made via a multiplexer 41. Data line DO is connected to an address counter 34 and to a data write register 42 which contains the item of data to be written in the memory of computer 40. A data read register 32 is connected directly to the output of the computer 40 and is used to read data from the memory of the computer 40. The output of register 32 is connected to bus DI. The output of computer 40 is also connected to FIFO stack registers 30 which receive the input/output functions. The output of registers 30 is connected to data line DI. An exchange between the coupler and the memory of computer 40 is performed in the write mode by means of a write-modification read cycle, and in the read mode by means of a read cycle, the coupler being the master.

The exchange concerned is a word exchange. The address counter 34 and the data write register 42, which are connected to bus $DO_{0-7}$ by means of coupling functions, may be loaded octet by octet. The incrementing or decrementing of the address is automatic and is caused by a coupling function. The data read register 32, which is connected to the output line DI be means of the coupling functions, may be read octet by octet. The coupler enables data to be transferred in blocks or in words. When data is being transferred in words, the address counter 34 is reloaded at each transfer request. When data is being transferred in blocks, the address counter 34 is only loaded at the beginning of each block. The request DT for a transfer on bus BC of the computer 40 and the selection of the direction of transfer are microprogrammed actions. A transfer which has been requested is performed when the computer authorizes it and the coupler recognizes itself as having the higher priority.

The microprocessor 36 recognizes the input/output functions by periodically scrutinizing the FIFO registers 30.

In the particular case where an item of data read from the memory does not require processing, it is possible to perform a direct transfer from the data register to the matcher. In cases where an item of data to be written into the memory does not require processing, the adapter may transfer the data directly to the write register 42 by inhibiting the microprocessor.

The signals for input/output function present, bus busy, and interrupt in process are transmitted along leads $EV_0$ to $EV_2$ to the input of the logic selector unit 18.

FIG. 4 shows the format of the standard microinstruction used to control operations internal and external to the microprocessor.

A microinstruction of this kind enables a coupling function and an arithmetic logic function to be performed simultaneously. It contains a zone $I_8$ to $I_6$ which indicates the destination of the action which is to be performed.

Zone $I_5$ to $I_3$ indicates the function which is to be performed. Zone $I_2$ and $I_0$ indicates the source from which the operands are to be taken. Zone $A_0$ to $A_3$ indicates the register in RAM 2 which can be selected to supply the first or second operand R or S by zone $I_0$ to $I_2$. Zone $B_0$ and $B_3$ designates the register in RAM 2 which may be selected to supply the second operand 5 by zone $I_2$ to $I_0$ and which will be used to record the result of the operation performed.

Zone $FC_0$ to $FC_7$ indicates the coupling function or functions which are used. When ($VFC_0$, $VFC_1$, $VFC_2$) = (1, 1, 1) = (7), the bits $FC_0$ to $FC_5$ are used to select the condition which is to be tested by the logic selector unit 18 to enable an indirect conditional branch to be performed. As shown in FIG. 10, bits $FC_6$ and $FC_7$ are used to select the type of shift to be performed in registers D 1 and QS 6 of FIG. 1. When ($VFC_0$, $VFC_1$, $VFC_2$) = (1, 1, 0) = (6), bits $FC_0$ to $FC_7$ are set on data lines $DI_{0-7}$ of the microprocessor to form an immediate operand. When the combination of bits $VFC_0$ to $VFC_2$ is coded from 0 to 5, bits $FC_0$ to $FC_7$ are used for the coupling orders.

Zone $CS_0$ to $CS_3$ is used for sequencer control and the corresponding actions take place simultaneously with the actions above.

The main advantage of this particular organization for the format of the microinstruction is that it allows simultaneity between calculating operations and orders, namely, orders for coupling or shifting or indirect conditional branching. From the point of view of processing this represents a considerable saving of time.

The next microinstruction may be either (1) at the +1 address indicated by the microprogram counter 10, (2) at the +1 address indicated by the stack pointer 8, or (3) at the address indicated by the address register RA 12, which indicates a pre-loaded indirect branch address. A return address defined by the microprogram counter 10 may be stored in the stack 9 and the stack pointer 8 may be decremented.

In the form of a table, FIG. 5A summarizes the possibilities for selecting the sources of the operands, which may be either in an RAM registered 2 which is addressed by the address fields $A_0$ to $A_3$ or $B_0$ to $B_3$, or in the register Q 7, or on data line DI.

FIG. 5B summarizes, in the form of a table, the various operations which are performed by the calculating unit (ALU) 4 as a function of the code indicated by bits $I_3$ to $I_5$ in the field of the microinstruction and as a function of the carry bit $C_n$ emitted by the PROM memory 17. R and S represent the operands which are transmitted by outputs 6 and 7 of selector or multiplexer (MUX) 3. The symbols + and − designate adding and subtracting operations respectively. The symbol V is the symbol for union or logic OR. The symbol $\Lambda$ designates intersection or logic AND. The symbol $\oplus$ designates an exclusive-OR operation. The symbol $\overline{R}$ designates the operation of complementing R.

FIG. 6 summarizes, in the form of a table, the various actions performed as a function of the code indicated by bits $I_8$ to $I_6$ of the microinstruction.

From FIG. 6 it will be seen that the DO output of multiplexer 5 always transmits the operation result which is emitted by output 7 of the calculating unit 4, except in the case of the combination 010 for which output DO transmits the content of an RAM register 2 indicated by zone $A_0$ to $A_3$ of the microinstruction.

Also, the result of an operation may be transmitted to the RAM register with a shift to the right or left and/or to the Q register 7 depending upon what is indicated by bits $I_8$ to $I_6$. The type of shift is determined by the coupling functions $FC_6$ and $FC_7$ when $(VFC_0, VFC_1, VFC_2) = (1, 1, 1) = 7$ as is shown in FIG. 11.

FIG. 7 shows the format of a microinstruction for an unconditional branch or for altering the content of address register RA 12. A microinstruction of this kind enables a coupling order and a microprogram branch to the address indicated by the microinstruction or the loading of address register RA 12 of the sequencer with the value of the branch address to be performed simultaneously. A return address defined by the microprogram counter 10 may be stored in the stack 9. The calculating unit 4 considers a microinstruction of this kind to be non-operational.

FIG. 8 shows the format of a microinstruction for a conditional branch. A microinstruction of this kind only allows a conditional branch to be performed. The calculating unit 4 and the adapters interpret a microinstruction of this kind as non-operational. One of sixteen events may be tested and a branch depending upon a true or false condition may be requested. When the branching condition is not satisfied the next microinstruction is in sequence. In cases where the branching conditions is satisfied, a return address indicated by the microprogram counter 10 may be stored in the stack 9.

The invention is not of course restricted to the embodiments shown and described above and in fact covers all modifications of these.

We claim:

1. A microprocessor comprising:
   processing means for performing arithmetic logic operations on data;
   a control memory in which microinstructions are stored;
   means for addressing said control memory;
   means for permitting the simultaneous coupling of external data receiving and data transmitting means and the execution by said processing means of arithmetic logic operations on data exchanged between the external data receiving and transmitting means, said means for permitting simultaneous coupling and execution of data including means for decoding microinstructions read from said control memory; and
   the stored microinstructions including:
   a zone indicating the source of an operand to be supplied as data to said processing means,
   a zone indicating the particular arithmetic and/or logic operation to be performed by said processing means,
   a zone indicating the destination of the result of the arithmetic and/or logic operation which is performed,
   a zone indicating a coupling function, and
   a zone indicating the source of the next control memory address of a microinstruction sequence.

2. A microprocessor according to claim 1, wherein:
   said processing means includes working registers; and wherein
   the stored microinstructions further include:
   a zone for indicating particular working registers in said processing means to be used, and
   a zone for validating the indicated coupling function.

3. A microprocessor according to claim 1, which further comprises:
   means responsive to a zone read from said control memory indicating a coupling function for selecting either signals from means external to said microprocessor or signals from the output of said processing means; and
   means for controlling said means for addressing said control memory, said means for controlling receiving the output of said means for selecting.

4. A microprocessor according to claim 2, which further comprises:
   means responsive to a zone read from said control memory indicating a coupling function for selecting either signals from means external to said microprocessor or signals from the output of said processing means; and
   means for controlling said means for addressing said control memory, said means for controlling receiving the output of said means for selecting.

5. A microprocessor according to claim 3, wherein said means for selecting comprises:
   at least one multiplexer responsive to the zone of a microinstruction read from said control memory indicating a coupling function; and
   means for storing the selected signal.

6. A microprocessor according to claim 4, wherein said means for selecting comprises:
   at least one multiplexer responsive to the zone of a microinstruction read from said control memory indicating a coupling function; and
   means for storing the selected signal.

7. A microprocessor according to claim 6, wherein orders from the zone indicating a coupling function to at least one multiplexer in said selecting means are validated by a means responsive to a particular state of the zone of a microinstruction read from said control memory for validating the indicated coupling function.

8. A microprocessor according to claim 5, wherein said means for controlling said means for addressing comprises a programmable memory which is addressed by:
- the zone of a microinstruction read from said control memory indicating the source of the next control memory address;
- said means for storing the selected signal;
- a suspension request from an external device; and
- a carry bit which is output by said processing means.

9. A microprocessor according to claim 6, wherein said means for controlling said means for addressing comprises a programmable memory which is addressed by:
- the zone of a microinstruction read from said control memory indicating the source of the next control memory address;
- said means for storing the selected signal;
- a suspension request from an external device; and
- a carry bit which is output by said processing means.

10. A microprocessor according to claim 5, wherein said means for controlling said means for addressing said control memory has outputs connected to inputs of said means for addressing.

11. A microprocessor according to claim 6, wherein said means for controlling said means for addressing said control memory has outputs connected to inputs of said means for addressing.

12. A coupler for providing coupling between a computer and associated peripheral units, said coupler comprising:
- processing means for performing arithmetic logic operations on data transmitted to the peripheral units;
- a control memory in which microinstructions defining operations to be performed by said processing means are stored; and
- means for decoding microinstructions read from said control memory, which microinstructions act on said processing means and on said control memory, said decoding means including:
- means for selecting the source of an operand to be supplied as data to said processing means,
- means for causing a particular arithmetic and/or logic operation to be performed by said processing means,
- means for directing to a particular destination the result of the arithmetic and/or logic operation which is performed,
- means selecting particular working registers of said processing means to be employed in executing a microinstruction,
- means for causing a particular coupling function to be employed in executing a microinstruction,
- means for validating the indicated coupling function, and
- means for addressing microinstructions of a microprogram in sequence.

13. A coupler according to claim 12, further comprising means for inhibiting the output of said processing means when arithmetic logic operations are not to be performed on data transmitted through said coupler.

* * * * *